US007941807B2

(12) United States Patent
Wang (10) Patent No.: US 7,941,807 B2
(45) Date of Patent: May 10, 2011

(54) TRANSITIONAL RESOLUTION IN A JUST IN TIME ENVIRONMENT (75) Inventor: Zhong Liang Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1788 days.

(21) Appl. No.: 10/835,881

(22) Filed: Apr. 30, 2004

(65) Prior Publication Data

US 2005/0246695 A1 Nov. 3, 2005

(51) Int. Cl.
*G06F 3/00* (2006.01)
*G06F 9/44* (2006.01)

(52) U.S. Cl. ........................................ 719/316; 717/118
(58) Field of Classification Search .................. 719/310, 719/311, 316; 717/148, 118
See application file for complete search history.

(56) References Cited

U.S. PATENT DOCUMENTS

| 5,778,231 | A | * | 7/1998 | van Hoff et al. | ............... | 717/143 |
| 6,026,485 | A | * | 2/2000 | O'Connor et al. | ............ | 712/226 |
| 6,324,687 | B1 | | 11/2001 | Beadle et al. | | |
| 6,481,006 | B1 | | 11/2002 | Blandy et al. | | |
| 6,604,167 | B1 | | 8/2003 | Blandy et al. | | |
| 6,763,397 | B1 | * | 7/2004 | Bracha et al. | ................. | 719/332 |
| 6,910,207 | B2 | * | 6/2005 | Steinbusch | .................... | 717/153 |
| 7,426,576 | B1 | * | 9/2008 | Banga et al. | .................. | 709/245 |
| 7,493,616 | B2 | * | 2/2009 | Yach et al. | ..................... | 718/100 |
| 2003/0093775 | A1 | | 5/2003 | Hilton | | |
| 2003/0103507 | A1 | * | 6/2003 | Lynch et al. | ................... | 370/392 |

FOREIGN PATENT DOCUMENTS

JP    2000047879    2/2000

OTHER PUBLICATIONS

Vijay Sundaresan, Practical Virtual Method Call Resolution for Java, 2000.*
Ishizaki, K. et al., "A Study of Devirtualization Techniques for a Java™ Just-In-Time Compiler", ACM Digital Library, IBM Research, Tokyo Research Laboratory; 2002, pp. 294-310.
Pechtchanski, I. et al., "Dynamic Optimistic Interprocedural Analysis: a Framework and an Application", ACM Digital Library, IBM Research, T. J. Watson Research Center; 2001, pp. 195-210.
Sundaresan, V. et al., "Practical Virtual Method Call Resolution for Java", ACM Digital Library, Sable Research Group, School of Computer Science Mc Gill University, Montreal, Quebec, Canada, 2000, pp. 264-280.
Zaks, A. et al., "Sealed Calls in Java Packages", ACM Digital Library, IBM Research, Haifa, Israel, 2000, pp. 83-92.

(Continued)

*Primary Examiner* — Lechi Truong
(74) *Attorney, Agent, or Firm* — Steven M. Greenberg, Esq.; Carey, Rodriguez, Greenberg & Paul (57) ABSTRACT

A reference to data in program code is resolved during execution of the program code. A request to resolve the reference is classified based on a state of the referenced data and a source of the request. A transitional resolution for the reference is provided if the referenced data state indicates no accessible definition and resolution of the reference is allowed according to the request classification. A full resolution for the reference is provided if the referenced data state indicates an accessible definition according to the request classification. The request is removed only if the reference resolution is a full resolution.

30 Claims, 5 Drawing Sheets

OTHER PUBLICATIONS

Inspec Abstract for, "Overview of the IBM Java Just-in-Time Compiler", Suganuma T. et al. IBM Systems Journal, vol. 39, No. 1, pp. 175-193, 2000.

Inspec Abstract for, "Just in Time Instrumentation Technique", Ronsse, M. et al., Computer Architecture News, vol. 29, No. 1, pp. 43-54, Mar. 2001.

Inspec Abstract for, "Design, Implementation, and evaluation of Optimizations in a Just-in-Time Compiler", Ishizaki, K. et al., Proceedings of the ACM 1999 Java Grande Conference, pp. 119-128.

IBM Research Disclosure (43169), "Removing Unnecessary Calls to Java Constructors", Jan. 2002/151.

* cited by examiner

TRANSITIONAL RESOLUTION IN A JUST IN TIME ENVIRONMENT

BACKGROUND OF THE INVENTION

The present invention relates to the field of reference resolution in a just in time compilation environment.

Computer program code is compiled for implementation, which involves reading the program code, analyzing the semantic form for errors, optimizing the code to reduce cost during execution and translating the code into a language suitable for execution. During compiling, references in the code to other classes or data are resolved to incorporate memory locations for these referenced classes or data. However, if the references to be resolved are for classes or data that have not been loaded then resolution of these references may not be possible. Such references can be resolved during execution of the program code as the references are encountered and the classes or data are loaded.

In a Java programming environment, the code is compiled into bytecode that is interpreted by a Java Virtual Machine for execution. Alternatively, a just in time compiler turns the bytecode into instructions that can be executed directly by a processor. Since classes may be dynamically loaded in the Java environment, cross references among classes that are loaded at different times are taken into account during reference resolution.

BRIEF SUMMARY OF THE INVENTION

A reference to data in program code is resolved during execution of the program code. A request to resolve the reference is classified based on a state of the referenced data and a source of the request. A transitional resolution for the reference is provided if the referenced data state indicates no accessible definition and resolution of the reference is allowed according to the request classification. A full resolution for the reference is provided if the referenced data state indicates an accessible definition according to the request classification. The request is removed only if the reference resolution is a full resolution.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention maybe embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
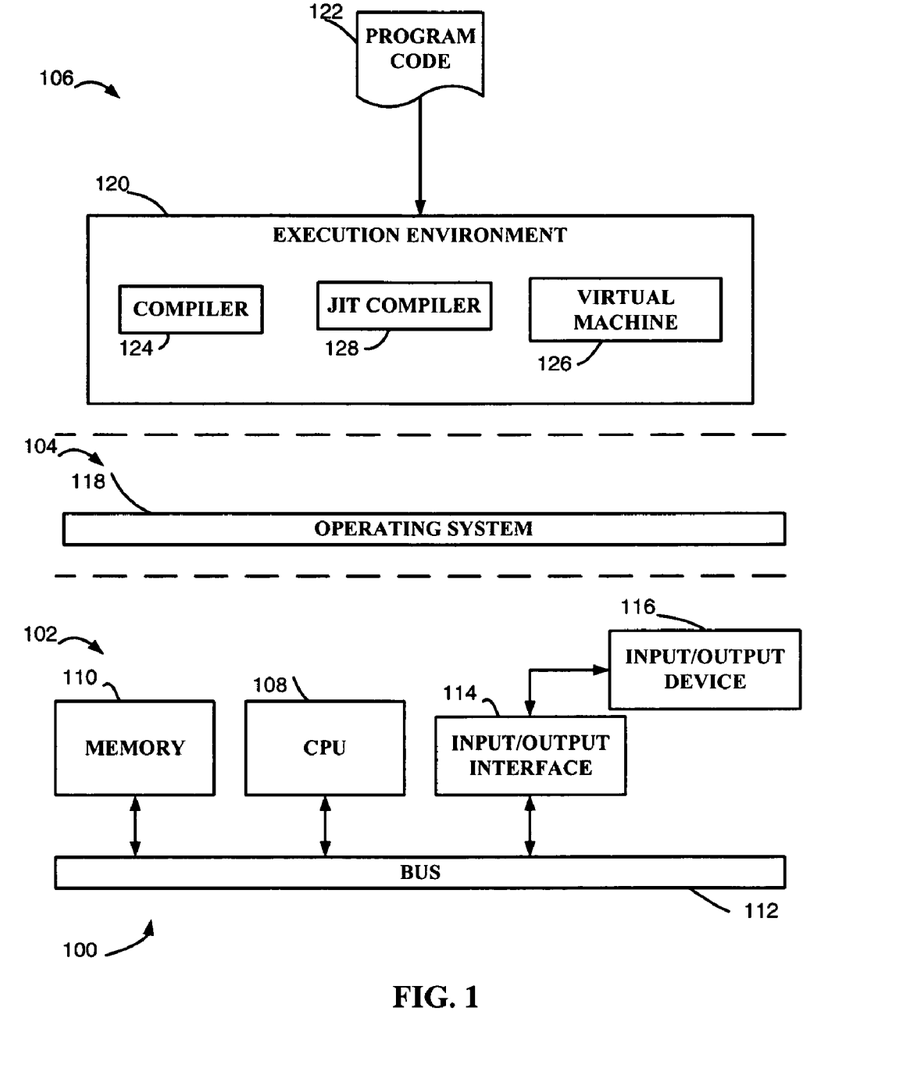
FIG. 1 is a system diagram of an exemplary computing environment suitable for implementation of the present invention.

FIG. 1 and the associated description represent an example of a suitable computing environment 100 in which the present invention may be implemented. The computer 100 has different layers of functionality that are built on top of each other to cooperatively operate. A hardware layer 102 includes the hardware resources in the computer 100. The operating system layer 104 runs in conjunction with the hardware layer 102 and interconnects the hardware layer 102 with a software layer 106. The software layer 106 contains the functionality with which a user interacts.

The hardware layer 102 contains the physical components of the computer 100 and includes a central processing unit (CPU) 108, a memory 110, an input/output interface 114 and a bus 112. The CPU 108, the memory 110 and the input/output interface 114 are connected with one another via the bus 112. The input/output interface 114 is configured so that it can be connected to an input/output unit 116.

The CPU 108 can be a commercially available CPU or a customized CPU suitable for operations described herein. Other variations of the CPU 108 can include a plurality of CPUs interconnected to coordinate various operations and functions. The computer 100 serves as an apparatus for performing the present method by the CPU 108 executing the present invention.

The operating system layer 104 includes an operating system 118 that interfaces with the physical components in the hardware layer 102. The operating system 118 may reside in the memory 110, be executed by the CPU 108 and take advantage of the bus 112 to interact with other components in the hardware layer 102.

The software layer 106 includes an execution environment 120 that transforms program code 122 supplied by a user into a form that can be executed by the computer 100. The execution environment 120 includes a compiler 120 that accepts the program code 122 and translates it into an intermediate form. A virtual machine 126 in the execution environment 120 obtains the intermediate form of the program code 122 and interfaces with the operating system 118 to interpret the code for execution on the computer 100 through interactions with components in the hardware layer 102. The virtual machine 126 may also provide the intermediate form to a just in time (JIT) compiler 128 that compiles the program code 122 for direct execution by the CPU 108. The virtual machine 126 retains the state of the program code 122 during execution including an indication of all data and class definitions that have been loaded into the execution environment 120.

The present invention may be incorporated in the JIT compiler 128 and the virtual machine 126 which may be embodied in a program stored in, for example, the memory 110. Alternatively, the present invention may be recorded on any type of recording medium such as a magnetic disk or an optical disk. The present invention recorded on such a recording medium may be loaded into the memory 110 of the computer 100 via the input/output unit 116 (e.g. a disk drive).

Compilation requests are initiated by the virtual machine 126 based on criteria for execution benefits by compiling a particular section of the intermediate form. The JIT compiler 128 compiles these sections into a form that can be directly executed by the CPU 108. The direct execution form is provided to the virtual machine 126 and used in a manner that is beneficial for the virtual machine 126. For example, upon encountering these sections during a later or a subsequent execution of the program code 122 these sections need not be compiled again and the compiled form can be executed directly.

The JIT compiler 128 attempts to resolve any references to data or classes in the bytecode during compilation. An instruction to resolve the reference is inserted into the compiled bytecode (known as binary code) prior to the original instruction accessing the reference. The original access instruction may be a load, store or other such instruction. Resolution of references involves incorporating the memory address of the definition of the data or class to which the references refer into the binary code where the reference is located and removing the instruction to resolve the reference. Although the memory address of the definition of the referenced class or data is available, if the definition of the data or class has not yet been completely loaded into the execution environment 120 then the reference cannot be fully resolved. This situation may occur, for example, when classes are dynamically loaded. As a result, not all references are fully resolved at compilation. In such a situation the definition of the referenced data or class may not be in a state that is equally accessible to all executing threads and as such the reference is considered to have no accessible definition. Such a state in which the referenced data/class is equally accessible to all executing threads may be when the data/class is fully loaded and initialized or not loaded nor initialized.

During compilation, the JIT compiler 128 obtains information about data and class references from the virtual machine 126. For any references that cannot be resolved, instructions are generated to resolve the reference during execution.

Figure 2:
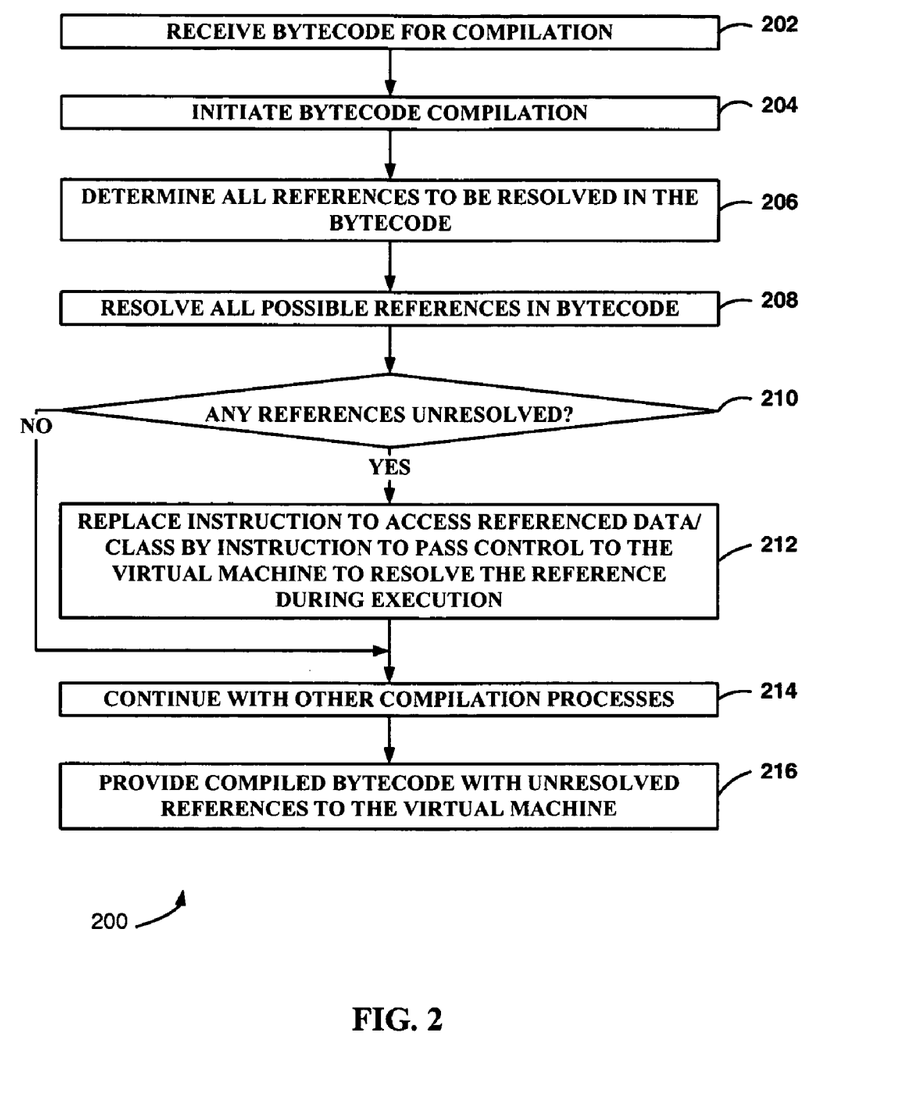
FIG. 2 is a flow diagram illustrating a method of compiling unresolvable references.

FIG. 2 illustrates a method 200 of compiling unresolvable references. Bytecode is received from the virtual machine 126 for compilation in step 202. Compiling is started and the initial compilation processes are performed in step 204. All references to be resolved are determined in step 206. The references that can be resolved are resolved in step 208. In step 210 it is determined if there are any references that have not been resolved. A reference is considered to be unresolvable during compilation if the definition of the data or class that is referred to has not been loaded into the execution environment 120.

For each reference that is unresolved, as determined in step 210, the instructions in the bytecode to access the referenced data or class (either load or store instruction) are replaced in the binary code by instructions to pass control to the virtual machine 126 during execution to resolve the reference. The virtual machine 126 will resolve the reference during execution when the classes and data have been loaded into the execution environment 120.

After the unresolved references have been considered or if there were no unresolved references, compilation continues with other processes in step 214. After the bytecode has been compiled the resulting binary code is provided to the virtual machine 126 in step 216.

During execution of the binary code, the virtual machine 126 is called to resolve a reference whenever an unresolved reference is encountered. However, during execution there may be multiple threads executing the same section of the program code 122. For any references that have not been resolved, each of these threads are competing to completely resolve the reference. Some of these reference resolutions may have semantic constraints that affect the order of such resolution action.

There are three actions that can cause a class to be loaded, prepared and initialized: creating a new object of a class, reference to a static field of a class and invocation of a static method of a class. After the class is loaded and successfully initialized then these actions can proceed. In the execution environment 120 with the JIT compiler 128, normally competing threads can resolve references and take advantage of each other (i.e., a particular unresolved reference doesn't need to be resolved over and over again by different threads).

However, before the loaded class is completely initialized, some resolutions of unresolved references which are to be done to move forward (e.g., class initialization itself needs them to be resolved and refers to the unresolved references) should appear to other threads as still unresolved otherwise the semantic order is broken. That is, before a class is completely initialized a static field reference happens to that class.

Figure 3A:
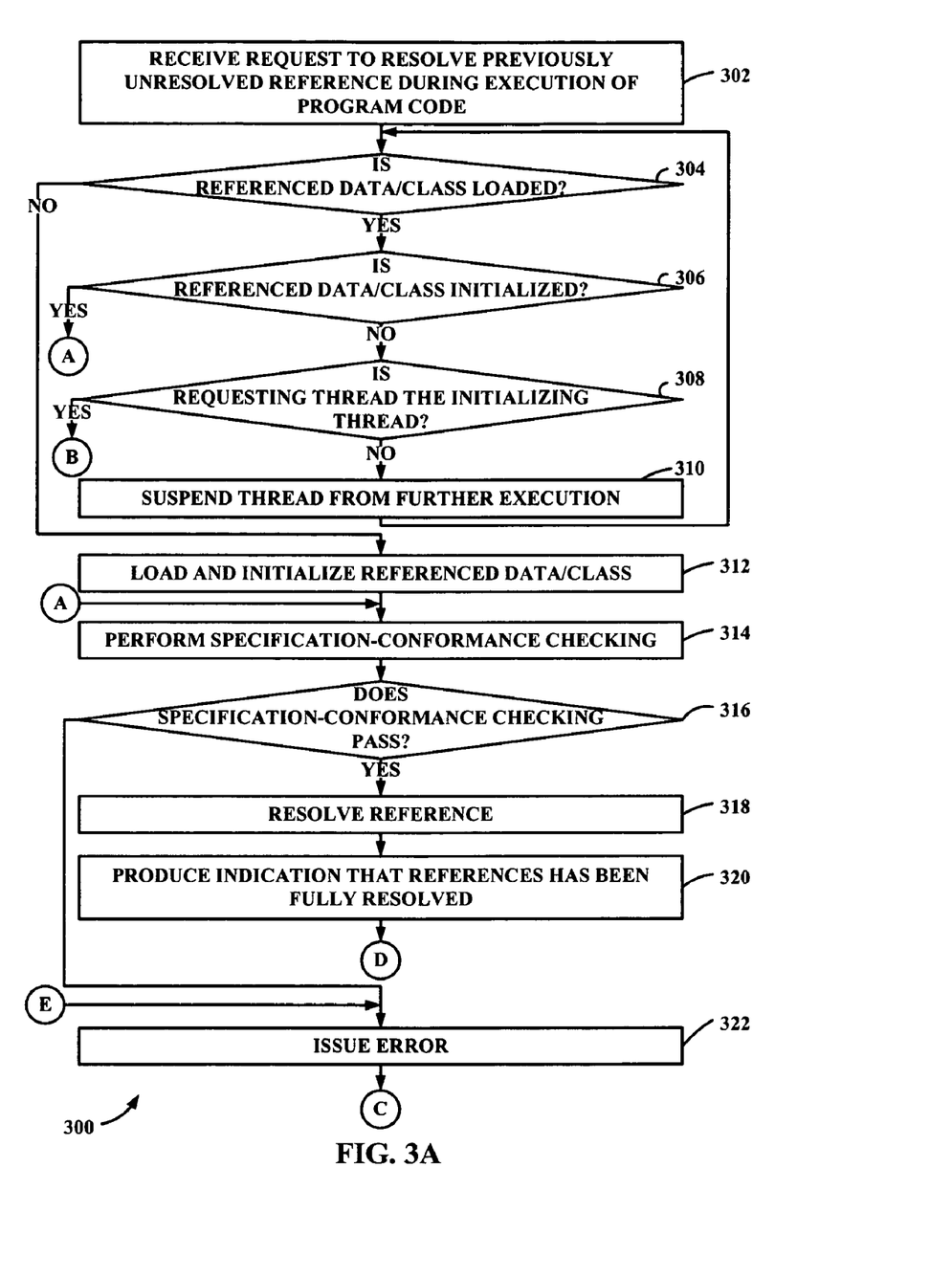
FIGS. 3A-B is a flow diagram illustrating a method of resolving unresolved references during execution.
Figure 3B:
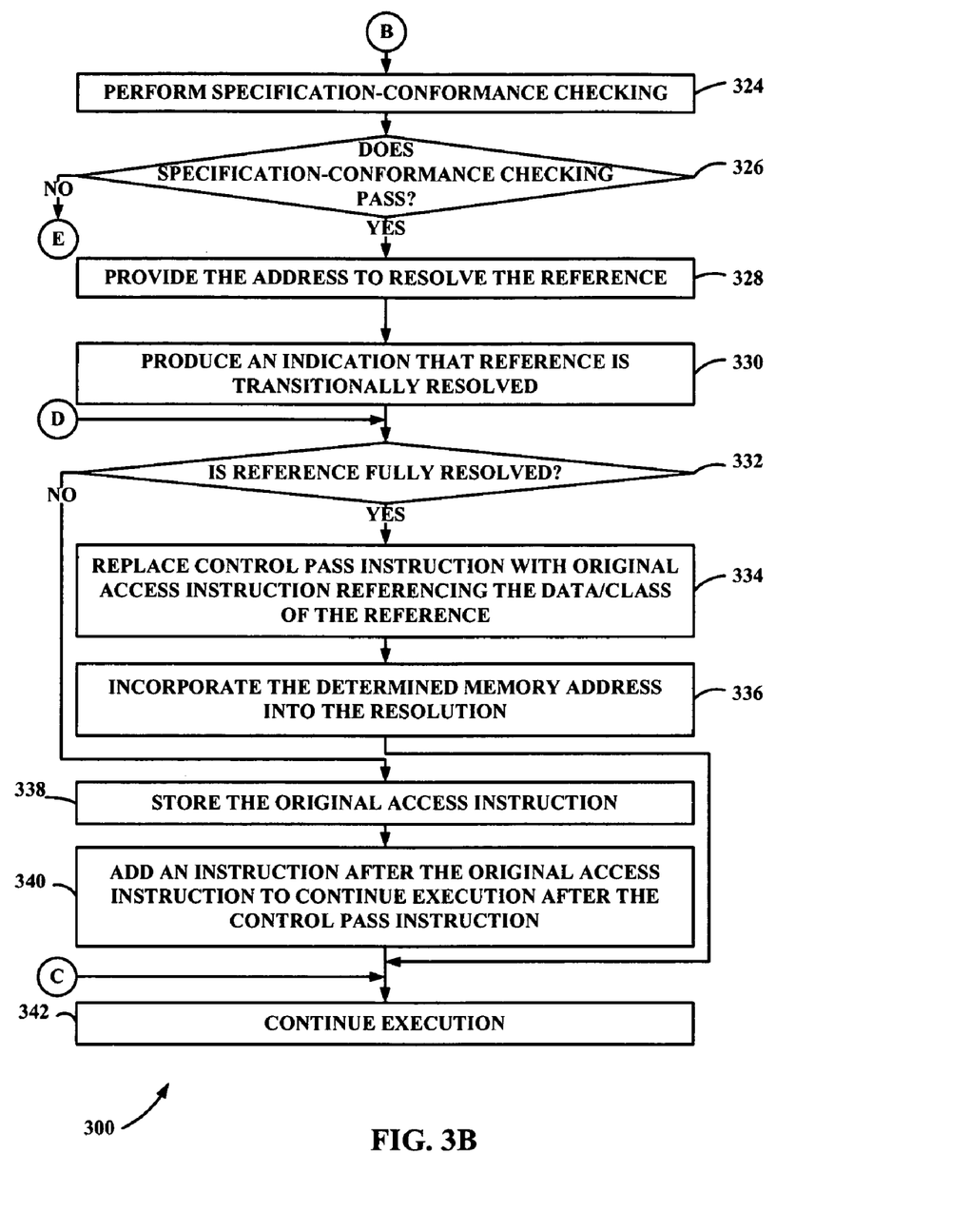

FIGS. 3A-B illustrate a method 300 of resolving unresolved references during execution. A request to resolve a previously unresolved reference is received by the virtual machine 126 during execution of the program code 122 in step 302.

Steps 304 to 308 classify the reference resolution request as being one of: (a) data/class already loaded and initialized; (b) data/class loaded but not initialized, thread not eligible to resolve reference; (c) data/class loaded but not initialized, thread eligible to resolve reference; and (d) data/class not loaded nor initialized. If the request is classified as (a) data/class already loaded and initialized then processing continues with step 314. If the request is classified as (b) data/class loaded but not initialized, thread not eligible to resolve reference then processing continues with step 310. If the request is classified as (c) data/class loaded but not initialized, thread eligible to resolve reference then processing continues with step 324. If the request is classified as (d) data/class not loaded nor initialized then processing continues with step 312.

It is determined in step 304 whether or not the data or class to which the reference refers has been initialized (or loaded into the execution environment 120).

If the request is classified as (d), the referenced data/class has not been loaded nor initialized, then the referenced data/class is loaded in step 312 and specification-conformance checking is performed in step 314. If the specification-conformance checking passes as determined in step 316 then the reference is resolved in step 318 in a conventional manner. Such a full resolution may involve incorporating the memory address of the referenced data/class with the reference, performing accessability checking of the referenced data/class and removing the request to resolve the reference (which is performed in a later step). After the reference has been resolved an indication that this was a full resolution is produced in step 320.

If the specification-conformance checking does not pass, as determined in step 316 then an error is issued in step 322 after which processing continues in step 342.

There are different ways of producing the indication and the resolution result. The resolution request is a call to the virtual machine 126. The call can return multiple results with one of them being the indication and another being the address of the referenced data/class. The address may be 4-byte aligned, i.e., the lower 2 bits are 0. The lowest bit can be used to indicate whether this resolution is a transitional one. For example, if the returned result has 1 as the lowest bit's value, then this resolution is a transitional one, otherwise, it is a full resolution.

If the referenced data/class has been completely loaded, as determined in step 304, then step 306 determines if the referenced data/class has been initialized. If the referenced data/class has been initialized then the request is classified as (c) and specification-conformance checking is performed in step 314. If the specification-conformance checking passes as determined in step 316 then the reference is resolved in step 318 in a conventional manner. After the reference has been resolved an indication that this was a full resolution is produced in step 320. If the specification-conformance checking does not pass, as determined in step 316 then an error is issued in step 322 after which processing continues in step 342.

If the referenced data/class has not been initialized then step 308 determines if the requesting thread is the initializing thread for the referenced data/class. A thread can resolve the reference to an uninitialized data/class if the thread is performing the data/class initialization. All other threads (i.e. those not initializing the data/class) are considered to be ineligible to resolve the reference if the referenced data/class is not completely initialized and if the referenced data/class has been loaded. If the referenced data/class is loaded but not initialized and the thread is not the initializing thread then the request is classified as (b) and then execution of the thread is suspended in step 310. Such suspension may provide time for the referenced data/class to be completely loaded before step 304 is repeated to determine if the loading has been completed.

If the requesting thread is the initializing thread then the request is classified as (c) and specification-conformance checking is performed in step 324. If the specification-conformance checking passes, as determined in step 326 then a transitional resolution is used for the reference so that processing of the thread can continue. Such a transitional resolution provides the appearance of a full resolution form the perspective of other threads; however the resolution request in the binary code is not removed therefrom as is the case with a full resolution. As a result, the next time the thread is executed the request to resolve the reference will be performed again. The address of the referenced data/class is provided in step 328. This address is the same address that would be provided with the full resolution (step 318). An indication that this is a transitional resolution is provided in step 330.

If the specification-conformance checking fails, as determined in step 326, then an error is issued in step 322 after which processing continues in step 342.

After resolution (either transitional or full) has been performed, step 332 determines whether the resolution was full or transitional. If the reference was fully resolved then the instruction in the binary code that transferred control to the virtual machine 126 to resolve the reference is replaced by the original access instruction for the reference in step 334. The determined memory address for the reference is also incorporated with the access instruction in step 336. After this the reference is considered to be resolved and execution continues in step 342.

If the resolution was transitional as determined in step 332 then the original access instruction for the reference is stored in step 338. The access instruction can be stored in an area that can only be accessed by the thread, for example, on a stack for the thread requesting the resolution. A return instruction is added after the access instruction in step 340 after which other processing continues in step 342. The return instruction is arranged to by-pass the instruction call to the virtual machine 126 for reference resolution and return to the instruction point at which the reference should be resolved. The thread can then continue execution as if the unresolved reference was actually resolved. Next time, when the resolution point is encountered again, the reference is still unresolved. The same procedure is repeated until the instruction call of the virtual machine is replaced by the access instruction. From that point on, the unresolved reference appears to all parties as truly resolved.

After an unresolved reference is fully resolved (as opposed to transitionally resolved), the instructions used for resolution are removed. Next time, when the code is executed, it appears that the reference is resolved from the beginning (e.g. during compilation).

Figure 4:
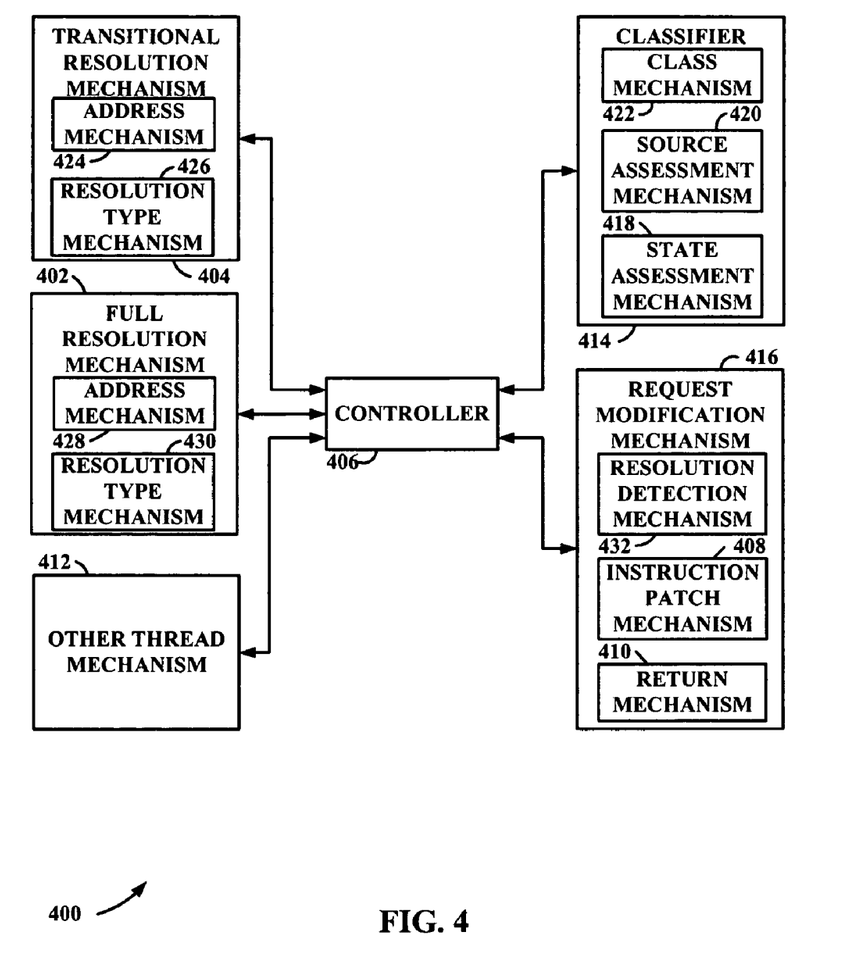
FIG. 4 is a system diagram for resolving unresolved references during execution.

FIG. 4 illustrates a system 400 for resolving unresolved references during execution. The system 400 comprises a controller 406 in communication with a classifier 414, a transitional resolution mechanism 404, a full resolution mechanism 402, an other thread mechanism 412 and a request modification mechanism 416, all of which function together to resolve references during execution.

The controller 406 receives the request to resolve the reference and provides the classifier 414 with relevant information to classify the status of the request including information on the thread requesting the resolution (e.g. data/class initializing thread, etc.) and the status of the referenced data/class (e.g. loaded, unloaded or being loaded). The classifier 414 comprises a state assessment mechanism 418, a source assessment mechanism 420 and a class mechanism 422. The state assessment mechanism 418 assesses the state of the referenced data/class to determine whether it is loaded, not loaded or being loaded. The source assessment mechanism 420 determines whether the source of the request to resolve the reference initiated from a thread that was an initializing thread. The class mechanism 422 classifies the reference resolution request as being one of: (a) data/class already loaded and initialized; (b) data/class loaded but not initialized, thread not eligible to resolve reference; (c) data/class loaded but not initialized, thread not eligible to resolve reference; and (d) data/class not loaded not initialized. The appropriate classification is provided to the controller 406.

The controller 406 invokes either the transitional resolution mechanism 404, the full resolution mechanism 402, or the other thread mechanism 412 depending on the classification provided by the classifier 414.

The full resolution mechanism 402 comprises an address mechanism 428 and a resolution type mechanism 430 that function together to provide a full resolution to the reference and is invoked when the classification is (a) data/class already loaded and initialized or (d) data/class not loaded or initialized. In the case of a classification of (d) then the class is loaded and initialized by the full resolution mechanism 402. To resolve the reference, the address mechanism 428 provides the memory address of the referenced data/class and the resolution type mechanism 430 provides an indication that the resolution is a full resolution.

The transitional resolution mechanism 404 comprises an address mechanism 424 and a resolution type mechanism 426 that function together and are invoked when the classification is (c) data/class loaded but not initialized, thread is eligible to resolve the reference. The transitional resolution mechanism 404 provides a transitional resolution that enables processing to continue and provides the appearance of a full resolution but without the data/class being completely loaded and so therefore cannot be a full resolution. The transitional address mechanism 424 provides an address (which is the same address provided by the full resolution mechanism 402) and the resolution type mechanism 426 provides an indication that the resolution is only transitional. A transitional resolution will be fully resolved at a later time after the data/class has been loaded.

The other thread mechanism 412 is invoked when the classification is (b) data/class not loaded but being loaded, thread is not eligible to resolve reference. If the classification is (b) then the other thread mechanism 412 suspends processing of the requesting thread to wait until the data/class has been loaded. The request. is sent back to the controller 406 after it has been suspended where it will be provided to the classifier 414 to determine if the classification has been changed (i.e., has the data/class been loaded).

The request modification mechanism 416 comprises an instruction patch mechanism 408, a return mechanism 410 and a resolution detection mechanism 432 that collectively function to modify the request based on the type of the resolution. The resolution detection mechanism 432 determines whether the resolution was a transitional resolution or a full resolution. If the resolution of the reference is a full resolution then the instruction patch mechanism 408 replaces the instruction to pass control to the virtual machine 126 to resolve the reference. The control pass instruction is replaced with the original instruction that involved accessing the referenced data/class. The memory location of the referenced data/class is also incorporated with the original instruction.

If the resolution was a transitional resolution then the return mechanism 410 completes processing of the request to resolve the reference. The return mechanism 410 stores the original instruction that involved accessing the referenced data/class in a store that can only be accessed by the thread. A return instruction is added after the stored instruction to continue execution after the control pass instruction.

The following example is an example of the use of a transitional resolution in a just in time environment. The following example takes advantage of functionality found in the Java language; however, this should not be taken to limit the present invention to the use of such language.

```
class Control {
    public static void checking( ) {
        if (Inventory.total!=0) {
            do something;}
        else {
            do something else;} }
        //Other code which may call checking( )
}
class Inventory {
    public static int total;
    //class intialization code
    {
    Control.checking( );
    total=certain number;
    }
    //other code
}
```

In the above example there. is a cross reference between the method checking in class Control and the value total in class Inventory. If there are two execution threads, one executing the code of class Control while the other is loading class Inventory, when reference to Inventory.total in the method checking comes to be resolved in connection with the Control thread, the class Inventory has not yet been completely loaded; thus the reference to Inventory.total is not yet valid in the context of the Control thread. At the same time the same reference to Inventory.total in the method checking is valid in the context of the Inventory thread since it is part of the class initialization process. To resolve this issue, the transition resolution is used for Inventory.total.

When the method checking in Control is compiled, Inventory is not yet completely loaded so the address of Inventory.total is not yet known so this reference cannot be completely resolved. To proceed with generation of executable code, the instruction to load Invenotry.total is replaced by a call to the runtime environment that will be made during execution of the code. When the method checking is executed, this call to the runtime environment will be encountered. The runtime environment will load the class Inventory, if necessary, and determine the address of inventory.total.

The resolution of Inventory.total will contain both the address and an indication as to whether or not this is a transitional resolution. If the resolution is transitional then the instruction in the code that contains the reference to Inventory.total will be stored in a private area for the thread, for example on the stack. A return instruction will also be added to the instruction on the thread-private area of the stack.

Reference in the context of the present invention maybe references to data, classes or any other variable. For the sake of simplicity, the references may be described as being a reference for data where data in this context may be considered to include classes, data and other variables.

The flowcharts and block diagrams of FIGS. 2-4 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

It is apparent to one skilled in the art that numerous modifications and departures from the specific embodiments described herein may be made without departing from the spirit and scope of the invention.

That which is claimed is:

1. A computer-implemented method of resolving a reference to data in program code during execution thereof, the method comprising:
classifying, within a processor, a request to resolve the reference based on
a state of the data referenced and
a source of the request;
providing a transitional resolution for the reference upon
the data referenced state indicating no accessible definition, and
resolution of the reference is allowed according to classification of the request.

2. The method of claim 1 further comprising:
providing a full resolution for the reference upon the state of the referenced data indicating an accessible definition according to the classification of the request.

3. The method of claim 2 further comprising:
removing the request only upon resolution of the reference being a full resolution.

4. The method of claim 3 wherein removing the request only upon resolution of the reference being a full resolution comprises:
determining whether the resolution of the reference is a full resolution or a transitional resolution;
replacing the request with an original instruction incorporating the resolved reference upon the resolution being a full resolution;
storing the original instruction incorporating a return control instruction.

5. The method of claim 4 wherein storing the original instruction incorporating a return control instruction comprises:
incorporating the return control instruction after the original instruction to continue execution of the program code after the request.

6. The method of claim 2 wherein providing a full resolution for the reference upon the state of the referenced data indicating an accessible definition according to the classification of the request comprises:
providing a memory address for the data referenced; and
providing an indication that the resolution is a full resolution.

7. The method of claim 1 wherein classifying a request to resolve the reference based on a state of the data referenced and a source of the request comprises:
determining whether the state of the data referenced indicates no accessible definition, an accessible definition or accessible definition being loaded;
determining whether the source of the request allows resolution of the reference; and
classifying the request as:
full resolution upon the state being an accessible definition is available,
transitional resolution upon the state being no accessible definition and the source allows resolution,
no resolution upon the state being no accessible definition and the source does not allow resolution, or
suspend upon the state being accessible definition being loaded and the source does not allow resolution.

8. The method of claim 7 wherein determining whether the source of the request allows resolution of the reference comprises:
identifying the source as allowing resolution of the reference upon the source of the request being an initializing thread.

9. The method of claim 1 wherein providing a transitional resolution for the reference upon the data referenced state indicating no accessible definition and resolution of the reference is allowed according to classification of the request comprises:
providing a memory address for the data referenced; and
providing an indication that the resolution is a transitional resolution.

10. A computer-implemented method of resolving a reference to data in program code during execution thereof, the method comprising:
determining, within a processor, whether the state of the data referenced indicates no accessible definition, an accessible definition or accessible definition being loaded;
determining whether the source of the request allows resolution of the reference; and
classifying the request as:
full resolution upon the state is an accessible definition being available,
transitional resolution upon the state being no accessible definition and the source allows resolution,
no resolution upon the state being no accessible definition and the source does not allow resolution, or
suspend upon the state being accessible definition being loaded and the source does not allow resolution;
providing a transitional resolution for the reference is upon the data referenced state indicating no accessible definition and resolution of the reference is allowed according to classification of the request;
providing a full resolution for the reference upon the state of the referenced data indicates an accessible definition according to the classification of the request.

11. The method of claim 10 wherein determining whether the source of the request allows resolution of the reference comprises:
  identifying the source as allowing resolution of the reference upon the source of the request being an initializing thread.

12. The method of claim 10 further comprising:
  determining whether the resolution of the reference is a full resolution or a transitional resolution;
  replacing the request with an original instruction incorporating the resolved reference upon the resolution being a full resolution;
  storing the original instruction incorporating a return control instruction.

13. A computer hardware system for resolving a reference to data in program code during execution thereof, the system comprising:
  a processor;
  a classifier configured to classify a request to resolve the reference, wherein classifications are based on a state of the data referenced and a source of the request; and
  a transitional resolution mechanism configured to
    communicate with the classifier, and
    provide a transitional resolution for the reference upon the state of the data referenced indicating no accessible definition and resolution of the reference is allowed according to classification of the request.

14. The system of claim 13 further comprising:
  a full resolution mechanism configured to
    communicate with the classifier, and
    provided a full resolution for the reference upon the state of the data referenced indicating an accessible definition according to the classification of the request.

15. The system of claim 14 further comprising:
  a request modification mechanism configured to communication with the transitional resolution mechanism and the full resolution mechanism to remove the request only upon resolution of the reference being a full resolution.

16. The system of claim 15 wherein the request modification mechanism comprises:
  a mechanism configured to determine whether the resolution of the reference is a full resolution or a transitional resolution;
  an instruction patch mechanism configured to replace the request with an original instruction incorporating the resolved reference upon the resolution being a full resolution; and
  a return mechanism configured to store the original instruction incorporating a return control instruction after the original instruction to continue execution of the program code after the request.

17. The system of claim 14 wherein the full resolution mechanism comprises:
  an address mechanism configured to provide a memory address for the data referenced; and
  a resolution type mechanism configured to provide an indication that the resolution is a full resolution.

18. The system of claim 13 wherein the classifier comprises:
  a state assessment mechanism configured to determine whether the state of the data referenced indicates no accessible definition, an accessible definition or accessible definition being loaded;
  a source assessment mechanism configured to determine whether the source of the request allows resolution of the reference if the source of the request is an initializing thread; and
  a class mechanism configured to classify the request as:
    full resolution upon the state is an accessible definition is available,
    transitional resolution upon the state being no accessible definition and the source allows resolution,
    no resolution upon the state being no accessible definition and the source does not allow resolution, or
    suspend upon the state being accessible definition being loaded and the source does not allow resolution.

19. The system of claim 13 wherein the transitional resolution mechanism comprises:
  an address mechanism configured to provide a memory address for the data referenced; and
  a resolution type mechanism configured to provide an indication that the resolution is a transitional resolution.

20. A computer program product for resolving a reference to data in program code during execution thereof, the computer program product comprising:
  a computer readable storage medium having computer readable program code stored therein, the computer readable program code, which when executed on a computer system, causes the computer system to perform the steps of:
  classifying a request to resolve the reference based on
    a state of the data referenced and
    a source of the request; and
  providing a transitional resolution for the reference upon
    the data referenced state indicates no accessible definition, and
    resolution of the reference is allowed according to classification of the request.

21. The computer program product of claim 20 further comprising:
  providing a full resolution for the reference upon the state of the referenced data indicating an accessible definition according to the classification of the request.

22. The computer program product of claim 21 further comprising:
  removing the request only upon resolution of the reference being a full resolution.

23. The computer program product of claim 22 wherein removing the request only upon resolution of the reference being a full resolution comprises:
  determining whether the resolution of the reference is a full resolution or a transitional resolution;
  replacing the request with an original instruction incorporating the resolved reference upon the resolution being a full resolution;
  storing the original instruction incorporating a return control instruction.

24. The computer program product of claim 23 wherein storing the original instruction incorporating a return control instruction comprises:
  incorporating the return control instruction after the original instruction to continue execution of the program code after the request.

25. The computer program product of claim 21 wherein providing a full resolution for the reference upon the state of the referenced data indicating an accessible definition according to the classification of the request comprises:
  providing a memory address for the data referenced; and
  providing an indication that the resolution is a full resolution.

26. The computer program product of claim 20 wherein classifying a request to resolve the reference based on a state of the data referenced and a source of the request comprises:

determining whether the state of the data referenced indicates no accessible definition, an accessible definition or accessible definition being loaded;

determining whether the source of the request allows resolution of the reference; and classifying the request as:
- full resolution upon the state being an accessible definition is available,
- transitional resolution upon the state being no accessible definition and the source allows resolution,
- no resolution upon the state being no accessible definition and the source does not allow resolution, or
- suspend upon the state being accessible definition being loaded and the source does not allow resolution.

27. The computer program product of claim 26 wherein determining whether the source of the request allows resolution of the reference comprises:
identifying the source as allowing resolution of the reference upon the source of the request being an initializing thread.

28. The computer program product of claim 20 wherein providing a transitional resolution for the reference upon the data referenced state indicating no accessible definition and resolution of the reference is allowed according to classification of the request comprises:
providing a memory address for the data referenced; and
providing an indication that the resolution is a transitional resolution.

29. A computer program product for resolving a reference to data in program code during execution thereof, the computer program product comprising:
a computer readable storage medium having computer readable program code stored therein, the computer readable program code, which when executed on a computer system, causes the computer system to perform the steps of:

determining whether the state of the data referenced indicates no accessible definition, an accessible definition or accessible definition being loaded;

determining whether the source of the request allows resolution of the reference;

classifying the request as
- full resolution upon the state being an accessible definition is available,
- transitional resolution upon the state being no accessible definition and the source allows resolution,
- no resolution upon the state being no accessible definition and the source does not allow resolution, or
- suspend upon the state being accessible definition being loaded and the source does not allow resolution;

providing a transitional resolution for the reference upon the data referenced state indicating no accessible definition and resolution of the reference is allowed according to classification of the request; and providing a full resolution for the reference upon the state of the referenced data indicating an accessible definition according to the classification of the request.

30. The computer program product of claim 29 further comprising:
removing the request only upon resolution of the reference being a full resolution.

* * * * *